May 6, 1924.
W. E. WEEKS
GRAIN CHUTE
Filed April 27, 1920
1,492,770
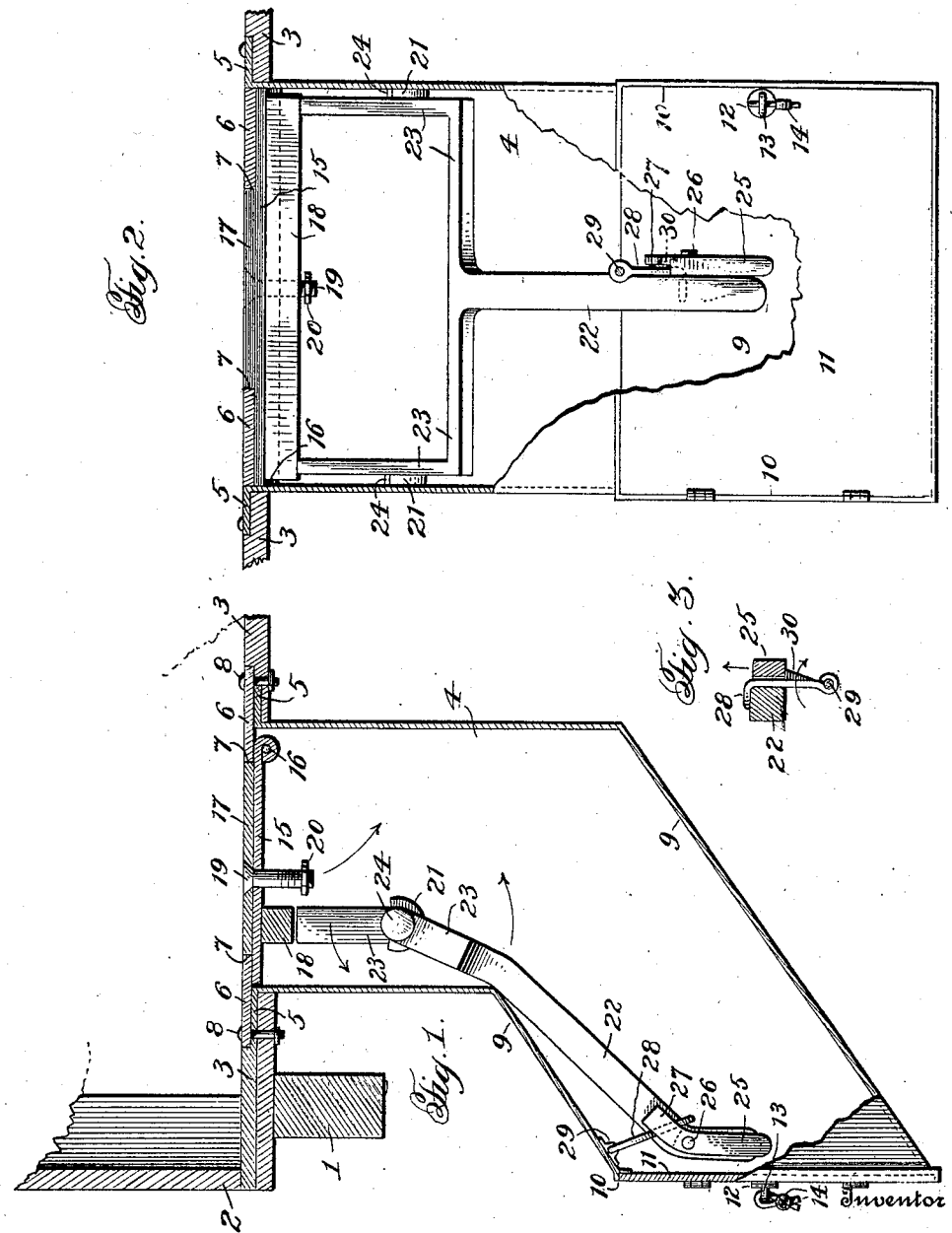

Patented May 6, 1924.

1,492,770

UNITED STATES PATENT OFFICE.

WARREN E. WEEKS, OF DAVENPORT, IOWA.

GRAIN CHUTE.

Application filed April 27, 1920. Serial No. 377,027.

*To all whom it may concern:*

Be it known that I, WARREN E. WEEKS, a citizen of the United States, residing at Davenport, in the county of Scott and State of Iowa, have invented certain new and useful Improvements in Grain Chutes, of which the following is a specification, reference being had therein to the accompanying drawing.

The present invention relates to grain chutes, and has for its principal object the provision of a chute adapted to be secured to the bottom of a freight or grain car for discharging the grain from the bottom of the car.

Another object consists in providing an angular extension on the chute so that the grain will be discharged to a point beyond the side of the car. A further object resides in the provision of a door at each end of the chute, and means for independently locking each door.

A still further object lies in providing means for releasing the upper door after the lower door has been opened.

With these and other objects in view my invention consists in the novel details of construction and arrangement of parts which will be more clearly understood from the following specification and drawings, in which:—

Figure 1 is a transverse vertical section through the chute and a portion of a car.

Figure 2 is a front elevation of the chute with parts broken away.

Figure 3 is a detail of the hook.

In carrying out my invention, 1 indicates the longitudinal beam of a freight or grain car, 2 the side of the car and 3 the bottom, all of usual construction. An opening is formed in the bottom of the car, adjacent the side, and a grain chute 4 extends through this opening. A flange 5 is provided around the upper end of the chute and is received in a recess formed around the opening in the car floor. A plate 6 having the opening 7 is secured over the floor opening and the end of the chute, and is secured to the top of the floor by means of bolts 8 or other suitable fastening elements.

An angular extension 9 is formed on the lower end of the chute and extends towards the side of the car. The lower end of the extension is formed with a seat or recess 10 and a door 11 is hinged to one side of the end of the extension, and when in closed position is seated in the recess 10. The door 11 carries a hasp 12 which, when the door is closed, engages over a staple 13. A seal 14 may be passed through the staple for sealing the door.

A door 15 is hingedly connected at 16 in the upper end of the chute and has a plate 17 secured to the upper face thereof. This plate 17 is smaller than the door 15 and is adapted to fit in the opening 7 in the floor plate 6 and lie flush with the upper face thereof, the door 15 being larger than the plate 17 forms a flange which extends beneath the edge of the floor plate 6, around the opening, and prevents grain from dropping through the door. A cleat 18 extends across the under side of the door adjacent the forward edge, for a purpose to be later described. A bolt 19 is loosely mounted in an opening formed in the door 15 and plate 17, and a nut 20 is received on the bolt. This bolt is used for raising or closing the door in a manner to be later described. A semicircular socket 21 is secured to each side of the chute 4, intermediate the ends. A lever is pivotally carried by these sockets, this lever comprising a handle 22 and a forked upper end 23. A lug or projection 24 is formed on each side of the forked portion of the lever and these lugs or projections 24 are received in the sockets 21. As shown in the drawings, the end of the handle is slightly bent so as to pass into the angular extension of the chute and will terminate a short distance from the inner face of the door 11, when said door is closed. A catch 25 is pivotally connected to the handle 22, at 26, and is cut away at the upper end, as shown at 27, for a purpose to be later described.

A hook 28 is secured to the top of the angular extension 9 by means of an eye 29 and this hook is provided with a beveled projection 30 on the side thereof.

From the above detailed description, it is thought that the advantages and mode of operating my chute will be clearly understood. When the car is to be filled the parts will be placed in the positions shown in Fig. 1, with the upper ends of the forked portion 23 of the lever engaging the under side of the cleat 18. The door 15 will be held closed and the hook 28 will engage the handle 22 adjacent the lower end. The pivoted catch 25 will engage the side of the hook, with the hook received in the cut-out portion 27. The door 11 will be closed and sealed and as the handle 22 extends to a point adjacent the inner face of the door the catch 25 cannot swing sufficiently on its pivot to be accidentally displaced. When it is desired to discharge the grain the seal 14 is broken and the door 11 opened. The catch 25 which engages the beveled projection 30 on the hook 28, is then swung to release the hook from the handle of the lever. When this has been done the handle of the lever is pushed inwardly and thereby swings the forked end outwardly to disengage it from beneath the cleat 18. This allows the door 15 to drop and discharge the grain through the chute. As the door 15 drops, the end of the bolt 19, having the nut 20, will engage the wall of the chute and force it through the opening in the door. The bolt may be grasped for raising the door to closed position.

From the above it will be seen that I have provided a chute whereby the grain may be readily discharged from the bottom of the car and deposited at a point to the side of the car. By having the two doors, at opposite ends of the chute, even though grain might seep through the upper door it would be caught by the lower door and held in the chute. At the same time the upper door cannot be released until the seal on the lower door is broken. It will be noted that my chute will be so arranged beneath the car that it will be protected by the running gear of the car and will not be broken by coming into contact with objects while the car is in motion.

While I have illustrated and described the preferred form of my invention, it will be understood that I may make such minor changes as will fall within the spirit and scope of the invention.

Having fully described my invention, what I claim as new and desire to secure by Letters Patent is:—

1. In combination with a receptacle, a chute leading therefrom, a door connected to the upper end of the chute, means entirely within the confines of the chute for holding the door in closed position, and a door for closing the lower end of the chute, said last mentioned door when open allowing access to and operation of the holding means of the first mentioned door.

2. In combination with a car, a chute leading from the bottom of the car, a door hingedly connected at each end of the chute, means for locking the lower door, a lever pivotally connected in the chute and engaging the under side of the upper door, and a hook connected to the chute and adapted to engage the lever.

3. In combination with a car, a chute leading from the bottom of the car, a door hingedly connected at each end of the chute, means for locking the lower door, a lever pivotally connected in the chute and engaging the under side of the upper door, a hook connected to the chute and adapted to engage the lever, and a catch pivoted to the lever and adapted to engage the hook.

4. In combination with a car, a chute leading from the bottom of the car, a door hingedly connected at the upper end of the chute, sockets secured in the chute, and a lever pivotally mounted in the sockets, the upper end of the lever adapted to engage the under side of the door.

5. In combination with a car, a chute leading from the bottom of the car, a door hingedly connected at the upper end of the chute, sockets secured in the chute, a lever, and projections on the lever adapted to be received in the sockets, the upper end of said lever adapted to engage the under side of the door.

6. In combination with a car, a chute leading from the bottom of the car, a door hingedly connected at each end of the chute, means for locking the lower door, sockets secured in the chute intermediate its ends, a lever, projections on the lever adapted to be received in the sockets, the end of the lever adapted to engage the under side of the upper door, a hook secured to the chute and adapted to engage the lever, a projection on the hook, and a catch pivotally connected to the lever, said catch adapted to engage the hook and bear against the projection thereon.

7. In combination with a car, a chute leading from the bottom of the car, a door hingedly connected at the upper end of the chute, a bolt loosely mounted in the door and extending therethrough, said bolt forming means for raising the door from lowered position, and means for holding the door in raised position.

8. In combination with a car, a chute leading from the bottom of the car, a door hingedly connected at the upper end of the chute, a bolt extending loosely through the door, said bolt depending from the door when the door is raised and adapted to be forced through the door when the door is lowered, and means for holding the door in raised position.

WARREN E. WEEKS.

Witnesses:
 MILDRED BRUHN,
 ALBERT H. BLOCK.